Dec. 25, 1951 G. W. VON HOFE ET AL 2,579,631

MECHANISM FOR APPLYING LABELS

Filed Oct. 18, 1949 6 Sheets-Sheet 1

INVENTORS
GEORGE W. VON HOFE
HANS A. NEFZGER
BY John J. Hart
ATTORNEY

INVENTORS
GEORGE W. VON HOFE
HANS A. NEFZGER
BY John J. Hart
ATTORNEY

INVENTORS
GEORGE W. VON HOFE
HANS A. NEFZGER
BY John J. Hart
ATTORNEY

INVENTORS
GEORGE W. VON HOFE
HANS A. NEFZGER
BY John J. Hart
ATTORNEY

INVENTORS
GEORGE W. VON HOFE
HANS A. NEFZGER
BY John J. Hart
ATTORNEY

INVENTORS.
GEORGE W. VON HOFE
HANS A. NEFZGER
BY John J. Hart
ATTORNEY.

Patented Dec. 25, 1951 2,579,631

UNITED STATES PATENT OFFICE 2,579,631

MECHANISM FOR APPLYING LABELS

George W. von Hofe, Bound Brook, and Hans A. Nefzger, Hackensack, N. J., assignors to New Jersey Machine Corporation, Hoboken, N. J., a corporation of New Jersey Application October 18, 1949, Serial No. 122,062

18 Claims. (Cl. 216—55)

This invention relates to labeling apparatus and more particularly to mechanisms in such apparatus for applying labels to articles.

The principal object of the invention is to provide in labeling apparatus, improved mechanisms for transferring labels into applying relation to the articles for which such labels were designed.

Figure 1:
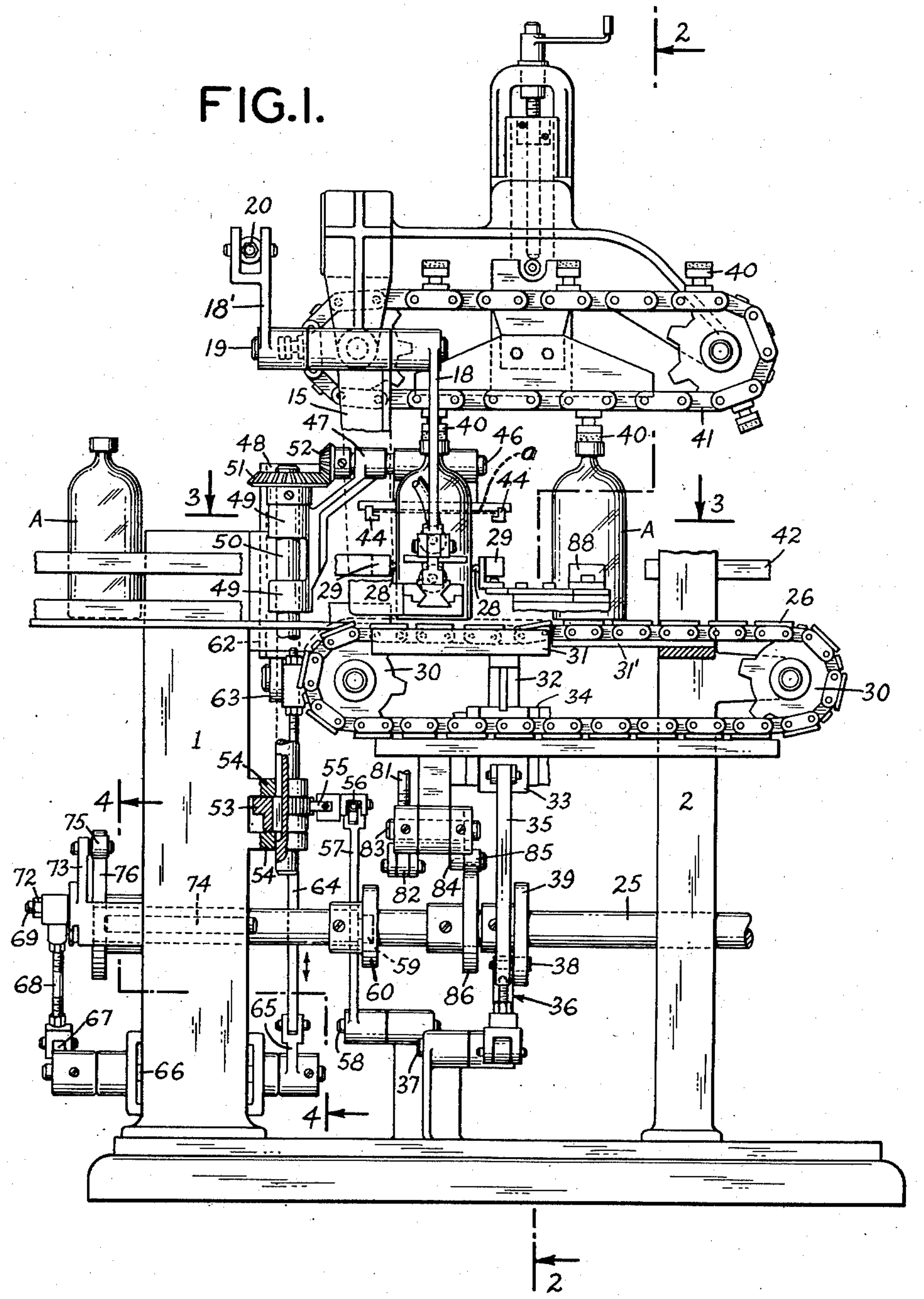
Figures 2, 5:
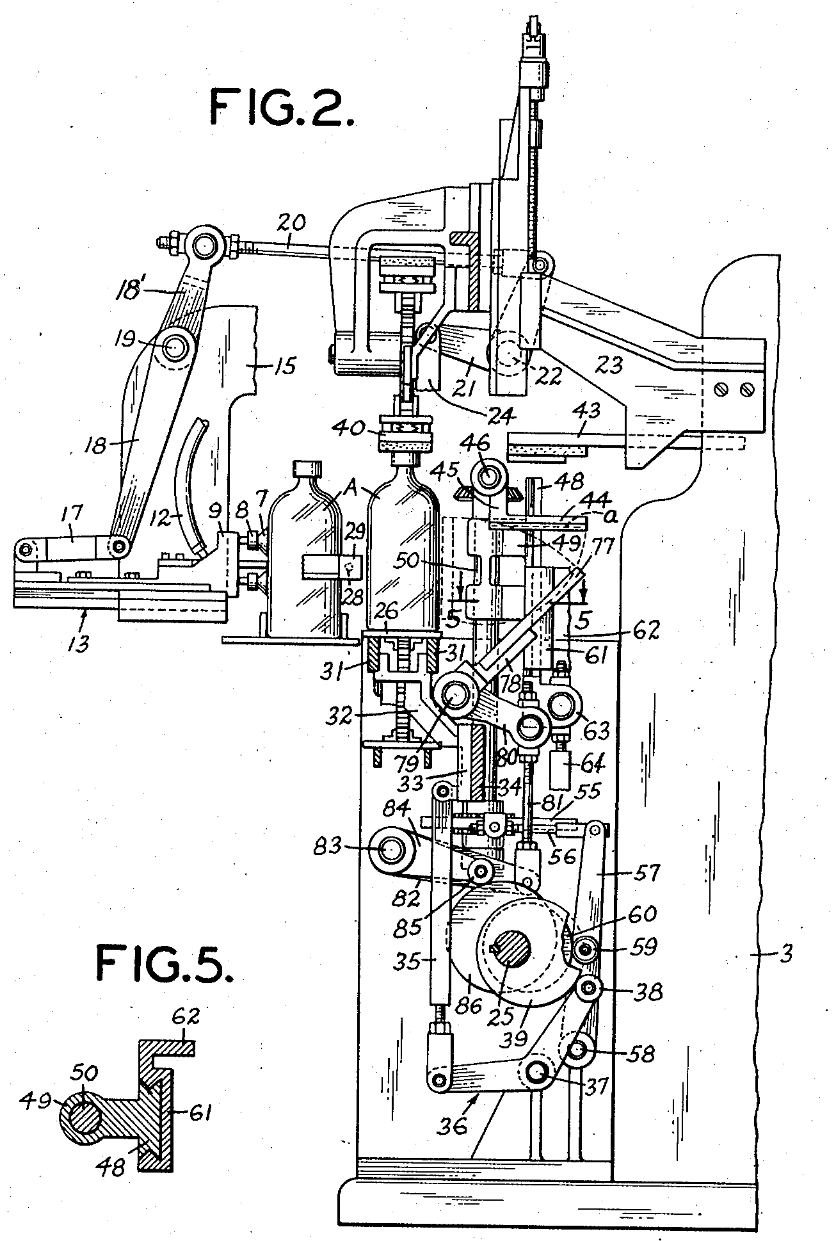
Figures 3, 4:
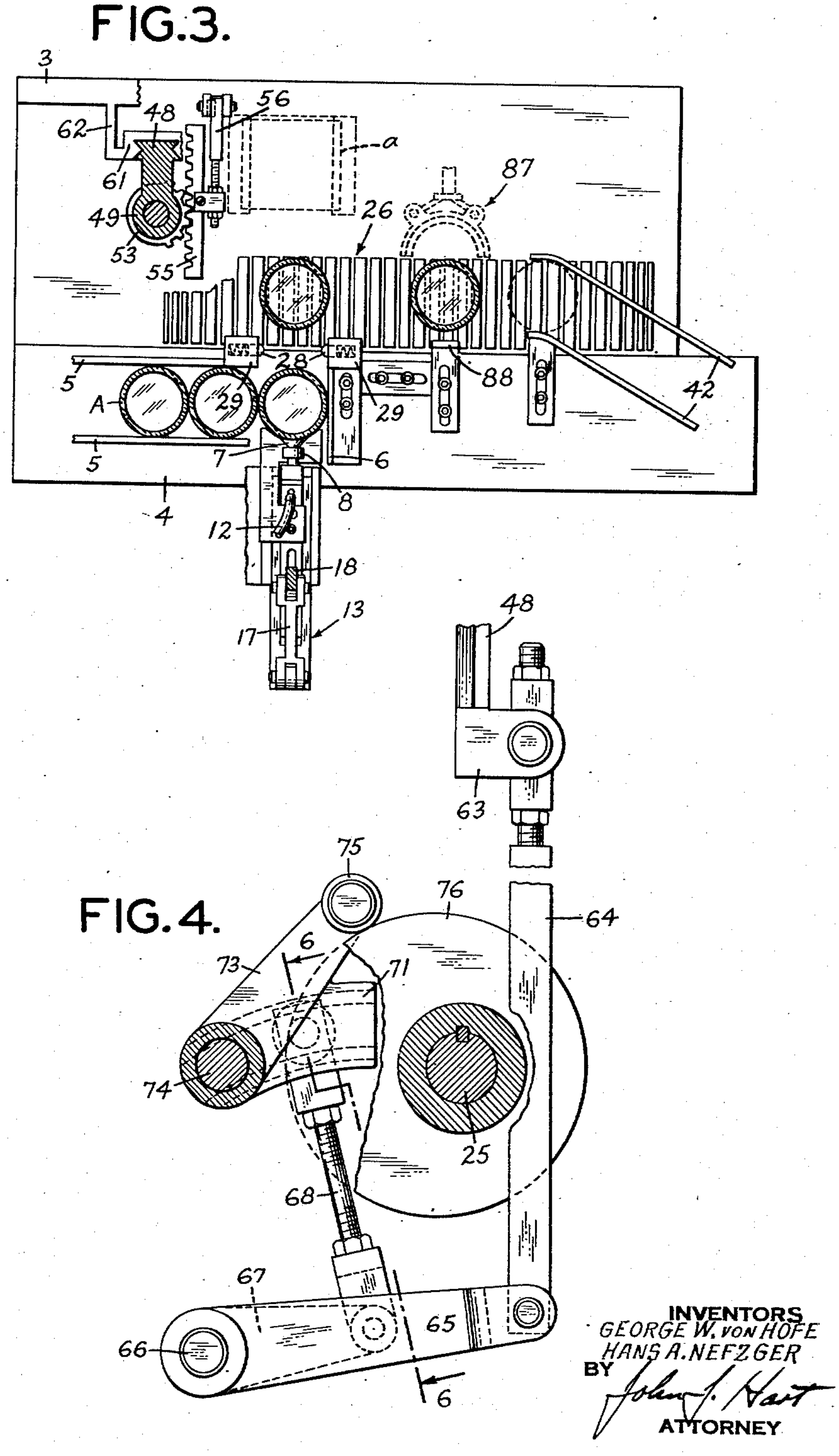
Figure 7:
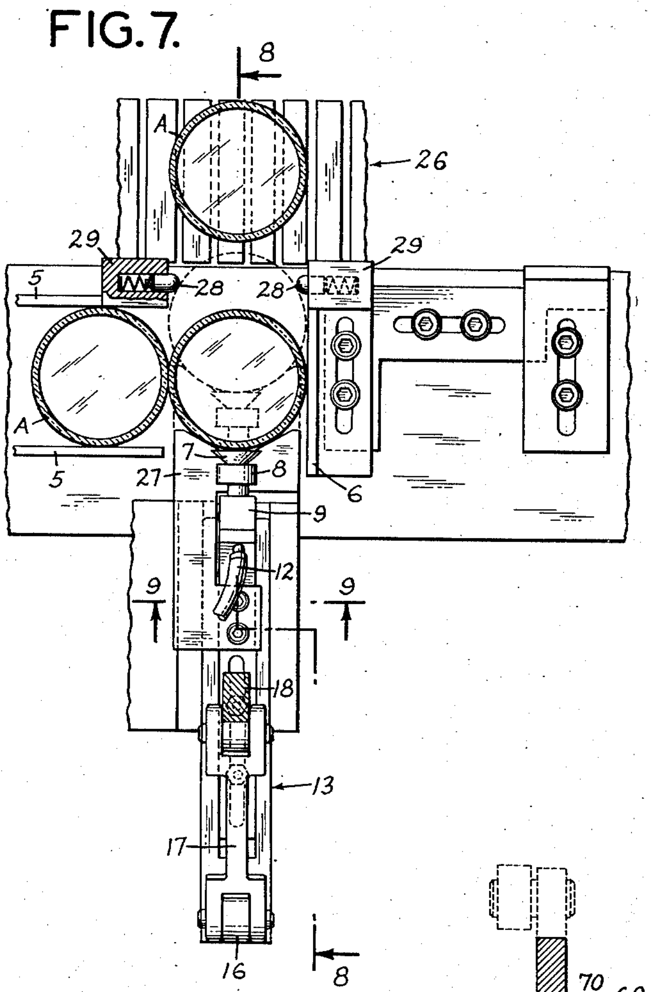
Figure 8:
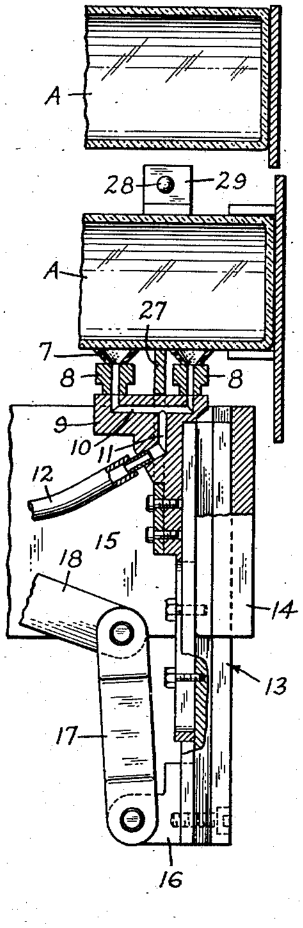
Figure 9:
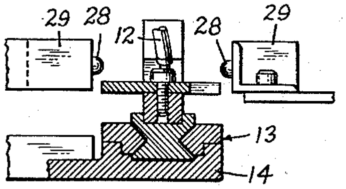
Figure 6:
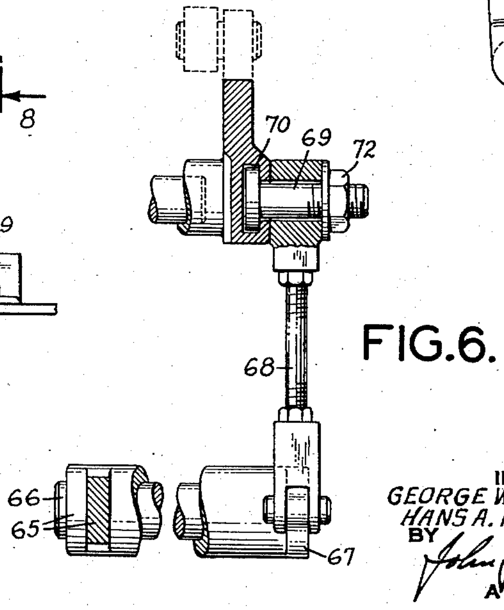
Figures 10, 11, 12:
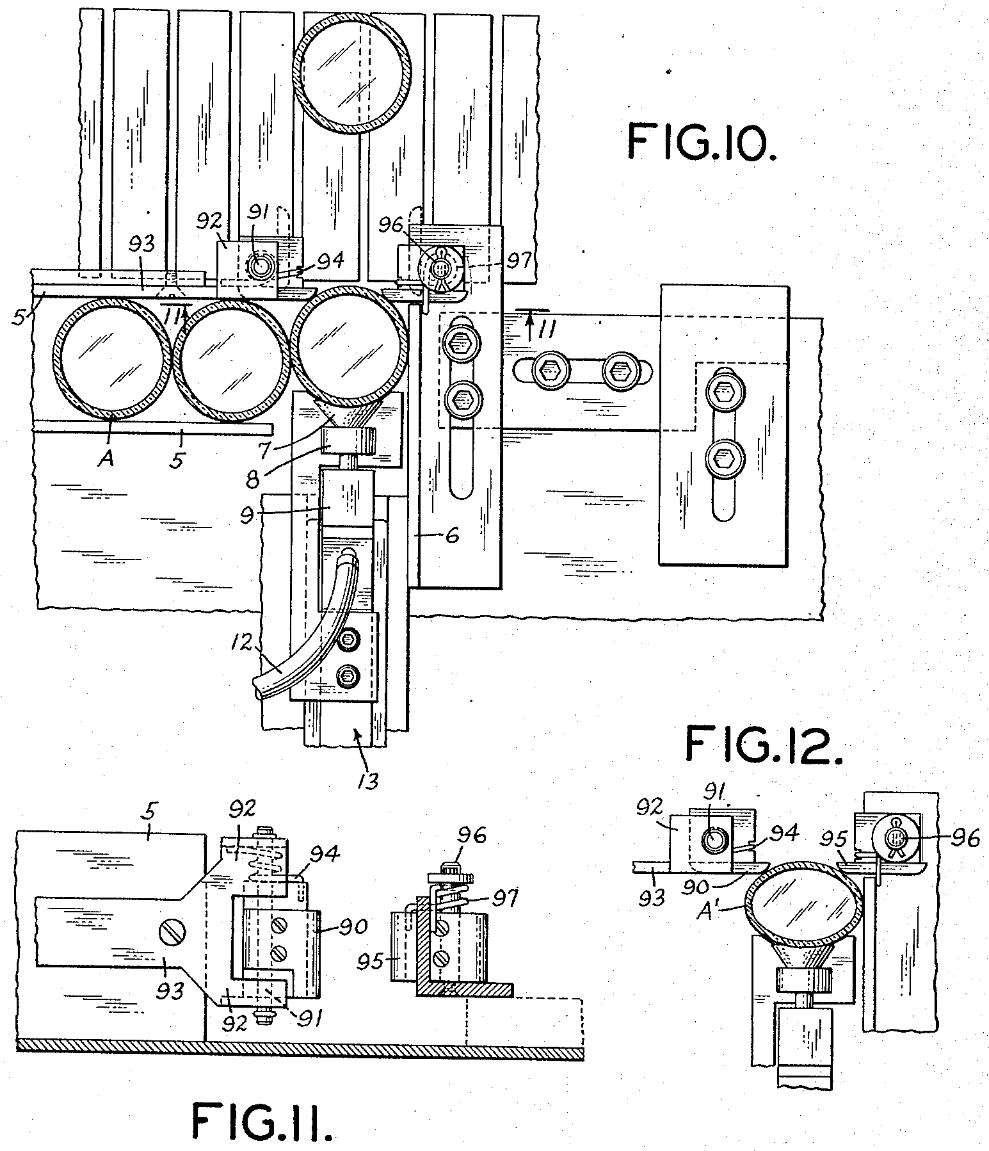
Figure 18:
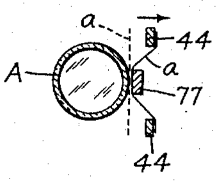

Other objects of the invention, as well as the features of novelty of the improved mechanisms, will appear from the following description when read in connection with the accompanying drawings, in which Fig. 1 is a front elevational view of a portion of a labeling machine provided with the invention; Fig. 2 is a sectional view taken along the line 2—2 of Fig. 1; Fig. 3 is a sectional view taken along the line 3—3 of Fig. 1; Fig. 4 is a sectional view taken along the line 4—4 of Fig. 1; Fig. 5 is a detail sectional view taken along the line 5—5 of Fig. 2; Fig. 6 is a sectional view taken along the line 6—6 of Fig. 4; Fig. 7 is an enlarged detail view of a portion of Fig. 3; Fig. 8 is a sectional view taken along the line 8—8 of Fig. 7; Fig. 9 is a sectional view taken along the line 9—9 of Fig. 7; Fig. 10 is a view similar to Fig. 7 showing a modified form of the invention; Fig. 11 is a sectional view taken along the line 11—11 of Fig. 10; Fig. 12 is a partial view of the mechanism shown in Fig. 10 illustrating the operation of such mechanism with an oval shaped bottle; Figs. 13 to 17 are side elevational views of the label manipulating elements illustrating the relationship of their various positions in applying a label to a bottle, and Fig. 18 is a horizontal sectional view illustrating the manner in which the label is stripped from the label carrying members.

The mechanism of the invention is designed for embodiment in a labeling machine in which the articles to be labeled, as exemplified by the bottles A, are transported along a predetermined path in an intermittent manner to stations in the machine at which the labeling operations are performed during the periods of rest in such travel of the articles. In the drawings, the numerals 1 and 2 designate the side legs of the frame of a conventional labeling machine and the numeral 3 designates generally, a rear portion of such frame. Supported on the front portion of the frame is an elongated narrow table 4 provided with longitudinally extending, spaced, guide rails 5, 5 between which the bottles A to be labeled are fed to the machine. As is shown more clearly in Figs. 3 and 7 of the drawings, the guide rails 5, 5 terminate short of stop member 6 adjustably secured to the table 4 and disposed transversely across the path defined by such rails. The stop member 6 is adjustably secured in position on table 4 at a distance from the adjacent ends of the rails 5, 5 slightly greater than the diameter of a bottle A, so that the bottle may be moved transversely therebetween.

Disposed intermediate the rails 5, 5 and the stop 6 are a pair of vacuum cups 7, 7 which are each made of a conically-shaped piece of flexible material such as rubber, and whose mouths are normally substantially flush with the inner surfaces of the outer rails 5, so as to be out of the path of the advancing line of bottles A. The cups 7 are mounted on a pair of nipples 8, 8 arranged one above the other in spaced relation on the forward end of a block 9. The passageways in the nipples 8, 8 are in communication with the ends of a U-shaped passageway 10 in block 9; the central portion of such passageway 10 communicating with a longitudinal passageway 11 to which is connected a hose 12, as is shown more clearly in Fig. 8 of the drawings. The hose 12 is connected to a source of vacuum which may be controlled in any suitable fashion to cause a vacuum condition to be created in the cups 7, 7 at predetermined intervals in the operation of the machine, as will hereinafter become more clear. The block 9 is secured upon a carrier slide 13 which is reciprocally mounted for slidable movement on a guide block 14 provided on the lower end of a bracket 15 secured to a fixed portion of the machine. The slide 13 is arranged to be reciprocated in properly timed synchronism with the associated mechanisms of the apparatus, and as shown, carries a lug 16 to which one end of a link 17 is pivotally connected. The other end of link 17 is pivotally connected to the lower end of a lever 18 which is fixed at its upper end to one end of a shaft 19 that is mounted for rotation in part of the bracket 15 (note Figs. 1 and 2). Secured to the other end of shaft 19 is a lever 18' which extends upwardly and rearwardly from such shaft. Any suitable means may be provided for rocking the lever 18' and consequently the lever in properly timed relation with the other parts of the mechanism. For instance, as shown, the upper end of lever 18' may be suitably connected to the forward end of an adjustable operating rod 20, whose rear end is connected to one arm of a bell-crank lever 21 mounted for pivotal movement on a shaft 22 supported by a bracket 23 secured to the rear frame portion 3. The other arm of bell-crank lever 21 may be connected to the upper end of a vertically disposed link 24 whose lower end may be connected by any suitable means to a cam provided on shaft 25 so as to reciprocate link 24 in a vertical direction in timed relation to the other mechanisms. Such means are not shown in the drawings for the sake of clearness, but may be similar to those illustrated for the actuation of the other mechanisms to be hereinafter described.

It will thus be seen that in the operation of the apparatus, the slide 13 will be reciprocated on the slide block 14 in predetermined timed relation to the other parts of the machine. On the advancing movement of slide 13, the suction cups 7, 7 will engage a bottle A positioned against stop 6, and move it transversely of table 4, between such stop and the ends of the guide rails 5, 5 and onto a conveyor 26. During the advancing movement of slide 13, the vacuum control means will cause a condition of vacuum to be created in cups 7, 7, which enables such cups to obtain a firm grip on the bottle and enables the bottle to be pushed bodily without danger of tipping and without rotative movement thereof. Mounted on block 9 between the suction cups 7, 7 is a projecting stop member 27 which engages the bottle A to control the degree of compression of the suction cups 7, 7 and therefore protects them against compressive forces greater than those necessary to enable them to get a firm vacuum grip on the bottle. After the bottle has been deposited on the conveyor 26 and just prior to the withdrawing movement of slide 13 to bring the cups 7, 7 back into normal position to advance another bottle, the vacuum condition in such cups is broken to permit the vacuum cups 7, 7 to readily release their hold on the bottle that has been advanced to conveyor 26. In its passage from table 4 to conveyor 26, the bottle A passes between a pair of spring pressed plungers 28, 28 mounted in blocks 29, 29 secured to the end of the upper inner rail 5 and stop 6. The plungers 28, 28 enable the suction cups 7, 7 to obtain a firm vacuum grip on the bottle A so that as the bottle is moved from table 4 to conveyor 26, it is always under control.

As is shown in Fig. 1 of the drawings, conveyor 26 is of the endless type, being supported at its ends by a pair of sprocket wheels 30, 30, one of which is an idler and the other of which is driven in an intermittent fashion by any suitable means so as to cause conveyor 26 to move intermittently in timed relation to the other mechanisms of the machine. The conveyor 26 is formed by chain links having plates fastened thereto to form a suitable endless platform on which the bottles may rest. In the region of the place of discharge of the bottles from table 4, there is provided a pair of horizontally arranged, parallel, movable rail sections 31, 31 engaging the undersurfaces of a plurality of the conveyor plates on the advanced upper portion of such conveyor 26; the remainder of the conveyor plates on the upper portion or strand of the conveyor 26 being movable over fixed rail sections 31′, as is customary. The rail sections 31, 31 are mounted on the upper outer end of a bracket 32 provided on a slide 33 mounted in a guide 34 for reciprocal sliding movement in a vertical direction; the guide 34 being supported by a bracket secured to a fixed portion of the frame. Pivotally connected at its upper end to the slide 33, is a vertically disposed, adjustable, operating rod 35, whose lower end is pivotally connected to one arm of a bell-crank lever 36 mounted for rotational movement about an axis 37. The other arm of lever 36 is provided with a cam roller 38 arranged to engage the outer periphery of a cam 39 mounted on shaft 25. Cam 39 is so designed that when the vacuum slide 13 is advancing, the rail sections 31, 31 will be in a lowered position to permit the conveyor plates positioned above such rail sections 31, 31 to be in a lowered position and on a level with or slightly below the top surface of table 4 (note Figs. 13–16). When a bottle A has been deposited on the conveyor plates supported by the rail sections 31, 31, the latter through cam 39, roller 38, lever 36, operating rod 35, slide 13 and bracket 32, will be raised to elevate such conveyor plates to the level at which the remainder of the plates on the upper strand of the conveyor 26 are maintained by the fixed rail sections. This operation is timed to take place during a pause in the intermittent movement of conveyor 26 and after the label has been applied to the bottle A (note Fig. 17).

When the rail sections 31, 31 are raised, the top of the bottle A that has just been deposited on conveyor 26 is brought into engagement with one of a plurality of clamping devices 40 (note Figs. 2 and 17) carried by an endless chain 41 which is movable in parallel relation to the conveyor 26 and in speed synchronism therewith in any suitable manner. The bottle A will thus be held in position on conveyor 26 by the clamping device 40 and on the next forward movement of conveyor 26 and chain 41, will be moved by conveyor 26 and clamping device 40 to a place over the fixed rail sections underlying the top strand of conveyor 26. On the next succeeding synchronous movement of conveyor 26 and chain 41, the clamping device 40 will rise as it approaches the end of the chain, thus freeing the bottle and permitting it to be discharged onto table 4 by the coaction of conveyor 26 and the obliquely disposed guide rails 42, 42 (note Fig. 3).

Figure 13:
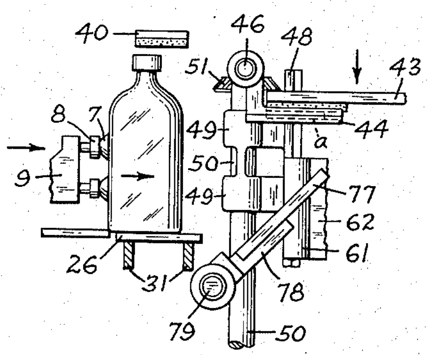

During the period of pause of the conveyor 26 and chain 41, and before the bottle A is first engaged between such conveyor and the clamping device 41, mechanism comes into operation to apply a label *a* to the bottle. As is shown more clearly in Fig. 2 of the drawings, the labels are delivered in a successive fashion to this station by means of a suction head 43 (see Fig. 2). The suction head 43 receives the labels in a well-known manner from the top of a suitably arranged stack thereof, carries them past means for either applying a coating of adhesive thereon, or for activating adhesive coatings already provided on the labels, and then deposits the labels upon and in temporary adhesive connection with two carrying members 44, 44, while the latter are in the label receiving position, as is shown in Figs. 2 and 13 of the drawings. The carrying members 44, 44 are disposed in predetermined, spaced, parallel relation to each other and are mounted upon brackets 45 fixed upon a rock-shaft 46, which is rotatably supported by a bearing bracket 47. As is shown more clearly in Figs. 1 and 2 of the drawings, the bracket 47 is mounted on a slide 48 and is provided with a pair of spaced, vertically aligned bearing members 49, 49 which rotatably support a vertically disposed shaft 50. Fixed to the upper end of shaft 50 and resting on the uppermost of the bearing members 49, is a bevel gear 51 which meshes with a pinion 52 secured to rock-shaft 46. Slidably keyed to the lower end of shaft 50 is a gear 53 which is located between two bearing members 54, 54 fixed to frame member 1. As is shown more clearly in Fig. 3 of the drawings, gear 53 is a partial pinion which engages with a straight rack bar 55 mounted on the outer end of an adjustable arm 56. The other end of arm 56 is pivotally connected to the upper end of a lever 57 mounted to oscillate about an axis 58. Between its ends, lever 57 is provided with a cam roller 59 which engages with a cam 60 mounted on shaft 25. Cam roller 59 may be maintained in engagement with cam 60 in any suitable manner, as by a spring (not shown) connected to lever 57, so as to normally urge it in a counterclockwise direction, as viewed in Fig. 2 of the drawings.

It will thus be seen, that as cam 60 through the engaging roller 59 oscillates lever 57 about its axis 58, arm 56 will actuate rack bar 55 longitudinally in a horizontal direction to rotate pinion 53 in a clockwise or counterclockwise direction, as viewed in Fig. 3 of the drawings. The rotational movement imparted to pinion 53 will cause shaft 50 to rotate and thereby rotate gears 51, 52, rock-shaft 46 and carrying members 44, 44. The arrangement of the parts is such that carrying members 44 are in a horizontal, raised position, as shown in Fig. 2 of the drawings, during the movement of conveyor 26 and while the suction head 43 is delivering a label thereto. During a pause in the movement of conveyor 26, rock-bar 55 is advanced by lever 57 to cause rock-shaft 46 to rotate in a clockwise direction, as viewed in Fig. 2, to bring the carrying arms 44, 44 and the label supported by such arms adjacently in back of the bottle A just deposited on conveyor 26, as is shown in dotted lines in Fig. 2 of the drawings (note also Fig. 14). The spacing of arms 44, 44 is such that they do not contact the bottle but position the central portion of the label in proper relation for adhesion to the bottle. It will be noted also that by reason of the keyed relation of pinion 53 with shaft 50, the latter may be moved longitudinally in a vertical direction during the strokes of rack-bar 55 without interfering with the rotative movements of such pinion and shaft and consequently, the rotative movements of gears 51, 52, rock-shaft 46 and carrying arms 44, 44.

Vertical movement is imparted to shaft 50 through the bearing members 49, 49 which are mounted upon the slide 48. As is shown more clearly in Figs. 3 and 5 of the drawings, slide 48 is mounted for vertically sliding movement in a guide 61 carried by a bracket 62 mounted on frame portion 3 of the machine. As is shown in Figs. 2 and 4 of the drawings, the lower end of slide 48 is provided with a bracket 63 by which it is pivotally connected to the upper end of an adjustable, operating rod 64. At its lower end, rod 64 is pivotally connected to the outer end of an arm 65 secured to a rotatably supported rock-shaft 66. Also secured to rock-shaft 66, is an arm 67 which is pivotally connected at its outer end to the lower end of an adjustable link 68. Link 68 is provided at its upper end with a transverse bolt 69 having a cylindrically-shaped head 70 adjustably movable in an arc-shaped guide 71. The bolt 69 is maintained in adjusted position by means of a nut 72 which when tightened, causes guide 71 to become part of the linkage intermediate arm 67 and a cam arm 73 integral with guide 71 and rotatably mounted on a shaft 74. The outer end of cam arm 73 is provided with a roller 75 which engages a cam 76 mounted on shaft 25.

It will be understood from the foregoing, that vertical movement is transmitted to the slide 48 from cam 76 through cam roller 75, arm 73, shaft 74, guide arm 71, link 68, arm 67, rock-shaft 66, arm 65 and actuating rod 64. It will also be understood that when the head 70 of bolt 69 is positioned at the left-hand end of guide 71 so that it is aligned with shaft 74, any movement imparted to cam arm 73 and its integral guide 71 by cam 76, will merely cause arm 73 and guide 71 to rock about shaft 74 without imparting any vertical movement to link 68. Thus, no vertical movement will be imparted to slide 48, and consequently the carrying members 44, 44 will be rotated about a substantially fixed axis, as their associated cam 60 causes the rack-bar 55 to reciprocate in a longitudinal direction. This position of bolt head 70 may be termed the zero adjustment of such mechanism. As the bolt head 70 however, is shifted to the right in guide 71 as viewed in Fig. 4 of the drawings and away from the pivoted axis of shaft 74, movement of cam arm 73 and guide 71 by cam 76 will cause link 68 and consequently slide 48 to reciprocate vertically. The further away from the axis of shaft 74, bolt head 70 is adjusted, the greater will be the strokes of link 67 and slide 48. Thus, the label carrying members 44, 44 will move in a vertical direction as well as in a rotary direction under the influence of cams 60 and 76, and the associated mechanisms (compare Figs. 13 and 14). It will be seen therefore, that by varying the adjustment of bolt 69 with relation to guide 71, the label carrying members 44, 44 can be made to vary the position of delivery of a label with respect to a bottle A, or in other words, to adjust the height at which the label is to be applied to the bottle. Thus, even though the position of the label is constant both on the stack, on the vacuum head 43 and on the carrying members 44, 44, its position with respect to the bottle can be varied by one simple adjustment, namely, the adjustment of bolt 69 with respect to guide 71. This greatly increases the flexibility of the machine as it can readily be adjusted to take care of different sized labels and bottles and variations in the positions of application of such labels on the bottles.

Figure 14:
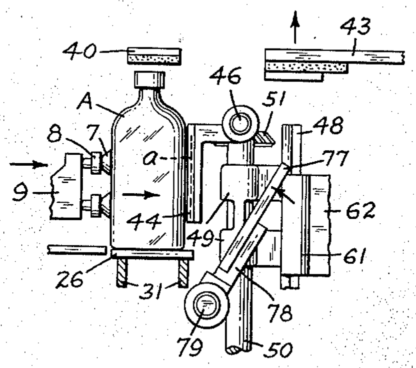
Figure 15:
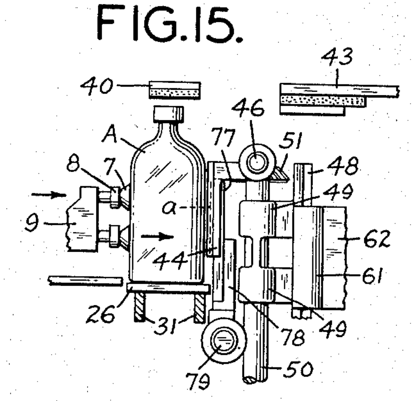
Figure 16:
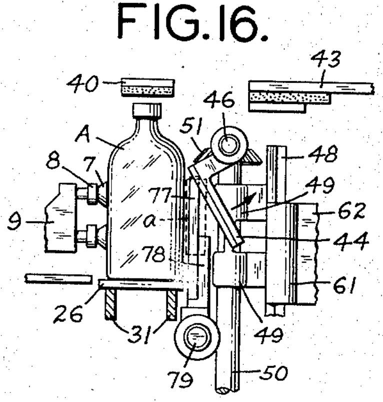
Figure 17:
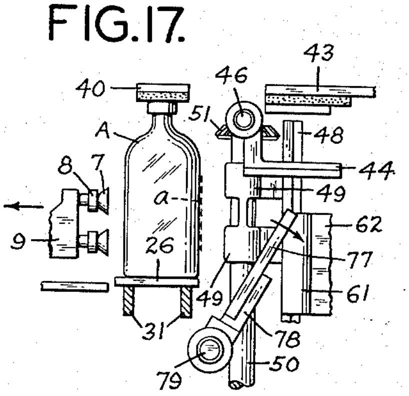

The labels *a* are carried by the members 44 to a position in proper relation for adhesion to the bottle (note Fig. 14). In the rocking movements of a shaft 79, to which is secured an arm 78 carrying a bar 77; bar 77 will be oscillated from the position shown in full lines in Figs. 2 and 13 of the drawings, upwardly following members 44 (Fig. 14) to a substantially vertical position in back of the label carried by members 44, along the path indicated by dotted line in such figure (note also Fig. 15). The bottle "A" is transferred under control from table 4 to conveyor 26 by slide 13 into contact with the label carried by members 44 (compare Figs. 13 to 16). The bar 77 serves as a back up member for the label to secure proper application of the label to the bottle A when the bottle A is brought into contact with the label by slide 13 (note Fig. 16). The members 44 start their return movement while the bar 77 is still in vertical position and in engagement with the label applied to the bottle. Thus, as the members 44, 44 start their return movement, the bar 77 will cause the label to be stripped from such members; this being possible because the adhesive on the label whereby the latter is connected to members 44, 44, has not yet fully set (note Figs. 16 and 18). The bar 77 is then retracted to the full line position shown in Fig. 2 of the drawings, leaving the label on the bottle but not completely secured to the latter (note also Fig. 17).

The mechanism for oscillating shaft 79 and consequently arm 78 and bar 77, comprises an arm 80 which is secured to shaft 79 and is pivotally connected at its outer end to the upper end of an adjustable, vertically disposed connecting link 81. At its lower end, link 81 is pivotally connected to an arm 82 secured to a rock-shaft 83. Shaft 83 has also secured thereto a cam arm 84 provided at its outer end with a roller 85 which engages with a cam 86 eccentrically mounted on shaft 25. It will thus be seen, that in the rotative movements of shaft 25, cam 86 through roller 85, arm 84, rock-shaft 83 and arm 82, will cause the rod or link 81 to be moved longitudinally in a vertical direction. The reciprocating movement of link 81 causes arm 80 to rock the shaft 79, thus causing bar 77 to oscillate about such shaft as an axis in the manner previously described.

It is believed that the operations of the mechanisms of the invention will be understood from the foregoing description, but its may be advisable to point out that the foremost bottles A in the line of bottles to be labeled and fed to the apparatus on table 4 between guide rails 5, 5, are periodically advanced to conveyor 26 during the periods of rest of such conveyor. As has been described, the feed to the bottles to conveyor 26 is accomplished by the slide 13 and its associated vacuum cups 7, 7; such slide pushing the bottles past the spring pressed plungers 28, 28 in their movement to the conveyor. During the advancing movement of the bottles, the suction means retains firm hold thereof, so that it is always under control and may be positioned in an exact and proper manner on conveyor 26 to enable it to be correctly clamped and labeled. The labeling operation, as has been explained, is accomplished by means of a suction head 43 which successively removes labels *a* from a stack of fixed position, and delivers such labels in a constant manner to the carrying members 44, 44, the labels *a* being retained in position on such members by the activated adhesive coating provided thereon (note Fig. 13). After a label *a* is delivered to the carrying members 44, 44, the latter are pivoted about a movable axis to bring the label into the desired position behind a bottle A (note Fig. 14). The movement of carrying members 44, 44 is a compound movement depending upon the size of the label and the position it will have on the bottle and is composed of a rotative movement of such members about the axis of shaft 46 and a vertical movement caused by the slide 48 moving shaft 46 downwardly in a vertical direction during such rotative movement of the members 44, 44 (compare Figs. 13 and 14). When the members 44, 44 have carried a label *a* to proper position with respect to the bottle, a label applying bar 77 moves in between such members engaging the central vertical portion of the label to the bottle and stripping such label from the members 44, 44 as the latter are retracted (compare Figs. 14 to 16 and 18). The stop bar 27 on the vacuum block 9 enables the label to be applied to the bottle under pressure without any danger of the bottle being disengaged from its position between the conveyor 26 and the clamping device 40. As bar 77 is retracted, conveyor 26 and clamping device 40 moves the bottle with the label partially applied thereto, to a position in front of a suitable label attaching means 87 (note Fig. 3) which cooperates with a stop 88 to complete the adhesive connection of the label to the bottle. The label attaching means 87 may be constructed in a conventional manner and is operated from a cam (not shown) on shaft 25 in timed relation to the other mechanisms. On the next step-by-step movement of the conveyor 26 and the chain 41 carrying the clamping devices 40, the completely labeled bottle is fed by conveyor 26 and guide rails 42, 42 back upon table 4 from which it may be removed to be packed.

It will be understood that while in Figs. 1 through 9 of the drawings, we have illustrated a preferred embodiment of the invention, various modifications and changes may be made therein within the spirit of the invention. Thus, instead of utilizing spring pressed plungers 28, 28 for assuring a proper grip of the vacuum feed means on the bottle, there may be employed means for accomplishing this purpose, such as shown in Figs. 10 through 12 of the drawings. In such means, the yieldable means comprises a shoe 90 which is mounted on a pin 91 for pivotal movement about a vertical axis. Pin 91 is rotatably supported on a pair of trunnions 92, 92 provided on a bracket 93 which is secured to the end of the inner guide rail 5. A spring member 94 is coiled about pin 91 and connected to shoe 90 and the upper trunnion 92 so as to normally maintain such shoe across the path of a bottle moved inwardly along stop 6 by slide 13 and the suction cups 7, 7 and to enable such shoe to yieldingly pivot inwardly about pin 91 as the slide 13 advances a bottle A to conveyor 26. Provided on stop 6 is a similarly arranged shoe 95 mounted for pivotal movement about a vertically disposed pin 96 carried by stop 6 and being controlled in its movements by a spring 97 coiled about pin 96 and suitably connected to such shoe 95 and to stop 6. It will thus be seen that as a bottle A is advanced to conveyor 26 by vacuum cups 7, 7 as slide 13 advances, the bottle will engage both shoes 90 and 95 and force them open; the pressure required to so open such shoes causing the vacuum cups 7, 7 to obtain a firm vacuum grip on the bottle. When the bottle has been advanced sufficiently on conveyor 26, the shoes 90, 95 under the tension of their associated springs, will return to normal position. The space between shoes 90, 95 is sufficient to enable cups 7, 7 and the associated portions of slide 13 to pass freely therebetween. This means has been found to be of particular advantage in properly orienting bottles other than round, such as the bottle A' of oval cross-section shown in Fig. 12 of the drawings, prior to their advancement onto conveyor 26.

We claim:

1. In a labeling machine, the combination of a support for an article, means for transferring a label from a label receiving position into applying relation to such article including a label carrying device, means for supporting said device for translatory movement about a pivotal axis, actuating means connected to said supporting means for producing translatory, pivotal movement of said device and means for adjusting said actuating means to vary the translatory movement of said device, and means movable into engagement with said label to disengage it from such device and to adhesively connect it to the article.

2. In a labeling machine, the combination of a support for an article, means for transferring a label from a label receiving position into applying relation to such article including a label carrying device, a shaft pivotally supporting said device, means for supporting said shaft for translatory movement along a fixed path, means for rotating said shaft and simultaneously causing translatory movement thereof along said path, and means movable into engagement with said label to disengage it from such device and to adhesively connect it to the article.

3. In a labeling machine, the combination of a support for an article, means for transferring a label from a label receiving position into applying relation to such article including a label carrying device, a shaft pivotally supporting said device, means for supporting said shaft for translatory movement along a fixed path, means for rotating said shaft, actuating means for causing translatory movement of said shaft along said path during the rotational movement thereof, means for adjusting said actuating means to vary the range of travel of said shaft along said fixed path, and means movable into engagement with said label to disengage it from such device and to adhesively connect it to the article.

4. In a labeling machine, the combination of a support for an article, means for transferring a label from a label receiving position into applying relation to such article including a label carrying device, means pivotally supporting said device, means for supporting said pivotal means for translatory movement along a fixed path, means for actuating said pivotal means to rotate said device, means for causing translatory movement of said pivotal means along said path during the rotational movement of said device and adjustable means for varying the action of said translatory means and consequently the range of movement of said pivotal means along said path, and means movable into engagement with said label to disengage it from such device and to adhesively connect it to the article.

5. In a labeling machine, the combination of a support for an article, means for transferring a label from a label receiving position into applying relation to such article including a label carrying device, a shaft pivotally supporting said device, a slide carrying said shaft, means for reciprocating said slide within a predetermined range, and means for rotating said shaft during the reciprocal movement of said slide, and means for removing a label carried by said device and adhesively connecting it to the article.

6. In a labeling machine, the combination of a support for an article, means for transferring a label from a label receiving position into applying relation to such article including a label carrying device, a shaft pivotally supporting said device, a slide mounted for reciprocal movement along a fixed path, means supporting said shaft and device on said slide, means for reciprocating said slide within a predetermined range during the operation of the machine comprising means capable of adjustably varying such range, and means for rotating said shaft during the reciprocal movement of said slide, and means for removing a label carried by said device and adhesively connecting it to the article.

7. In a labeling machine, the combination of a support for an article, means for transferring a label from a label receiving position into applying relation to such article including a label carrying device, a shaft pivotally supporting said device, a slide carrying said shaft, means for reciprocating said slide along a fixed path, and means for rotating said shaft during the reciprocal movement of said slide, adjustable means for controlling the range of movement of said slide comprising an arm oscillatable about a fixed axis, means for oscillating said arm in a predetermined manner, a link connected to said slide reciprocating means, means adjustably connecting said link to said arm whereby the effective length of said arm may be varied, and means for rotating said shaft during the reciprocal movement of said slide, and means for removing a label carried by said device and adhesively connecting it to the article.

8. In a labeling machine, the combination of a support for an article, means for positioning an article on said support including a slide, a vacuum device carried by said slide and engageable with an article to obtain a vacuum grip thereon, means for reciprocating said slide to cause said vacuum device to advance an article from a point of delivery to said support, and means for applying a label to an article so positioned on said support.

9. In a labeling machine, the combination of a support for an article, means for positioning an article on said support including a slide mounted for transverse movement toward and away from said support, means for reciprocating said slide, a vacuum device carried by said slide and engageable with an article to obtain a vacuum grip thereon during the advancing movement of said slide, and means for applying a label to an article so positioned on said support.

10. In a labeling machine, the combination of a support for an article, means for moving an article from a point of delivery to a position on said support including a slide, a vacuum device carried by said slide and engageable with an article to obtain a vacuum grip thereon, means for advancing said slide to advance the article towards said support, means in advance of said support for causing said vacuum device to firmly grip the article, and means for applying a label to an article positioned on said support.

11. In a labeling machine, the combination of a support for an article, means for moving an article from a point of delivery to a position on said support including a slide, a vacuum device carried by said slide and having a vacuum cup engageable with an article, means for advancing said slide to cause said vacuum cup to move the article towards the support, yieldable means in the path of movement of the article to cause said vacuum cup to firmly grip the article, and means for applying a label to the article positioned on said support.

12. A labeling machine such as defined in claim 11, in which said yieldable means includes a pair of spring pressed plungers mounted in opposed spaced relation and adapted to be depressed as an article is forced therebetween.

13. A labeling machine such as defined in claim 11, in which said yieldable means includes a pair of spaced shoes, means for pivotally supporting said shoes, and spring means for yieldingly resisting movement of said shoes in one direction.

14. In a labeling machine, the combination of a supporting conveyor that is intermittently advanced, means at a predetermined point in the travel of said conveyor to place an article thereon in a pause between movements of such conveyor, means for supporting said conveyor in a lowered position in the region of said point during the placement of an article thereon and operable to raise such portion of the conveyor after the article has been placed thereon, a holding conveyor overlying said supporting conveyor, means for intermittently advancing said holding conveyor in synchronism with said supporting conveyor, a clamping member carried by said holding conveyor and positioned thereon to engage the top of an article placed on said supporting conveyor when the latter is raised, whereby on the next step-by-step movement of said conveyors, the article will be moved therewith in clamped condition.

15. In a labeling machine, the combination of a supporting conveyor that is intermittently advanced, a movable rail supporting a portion of said conveyor, means for lowering and raising said rail between the intermittent movements of said conveyor, means for placing an article on said portion of the conveyor when the latter is in a lowered position, a holding conveyor overlying said supporting conveyor, means for intermittently advancing said holding conveyor in step with said supporting conveyor, a plurality of spaced clamping members projecting from said holding conveyor and positioned thereon to successively overlie said supporting conveyor portion between the intermittent movements of said conveyors, said clamping members successively engaging the tops of articles placed on the successive conveyor portions supported by said rail as the latter is intermittently raised, whereby the articles are successively moved in clamped condition by said supporting conveyor and by the clamping members of said holding conveyor.

16. In a labeling machine, the combination of a support for an article, means for transferring a label from a label receiving position into applying relation to such article including a label carrying device, means for moving said device with a compound translatory and pivotal movement from said label receiving position to article applying position, and means for adjusting said moving means to vary the compound movement of said device, and means movable into engagement with the label carried by said device at the end of such compound movement of the latter and operable to disengage the label from said device and to adhesively connect it to the article.

17. In a labeling machine, the combination of a support for an article, means for transferring a label from a label receiving position into applying relation to such article including a label carrying device, means for pivotally moving said device from said label receiving position to article applying position, means coacting with said pivoting means to shift the axis of pivotal movement of said device during such pivotal movement of the latter, whereby said device moves from label receiving position to article applying position with a compound translatory and pivotal movement, and means for adjusting said coacting means to vary the compound movement of said device, and means movable into engagement with the label carried by said device at the end of such compound movement of the latter and operable to disengage the label from said device and to adhesively connect it to the article.

18. In a labeling machine, the combination of a support for an article, means for transferring a label from a label receiving position into applying relation to such article including a label carrying device, means for successively depositing labels on said device at a predetermined place, means for moving said device along a predetermined path from said label receiving position to article applying position, and means for adjusting said movable means to vary the path of movement of said device in its travel from said label receiving position to article applying position, and means movable into engagement with the label carried by said device at the end of such movement of the latter and operable to disengage the label from said device and to adhesively connect it to the article.

GEORGE W. VON HOFE.
HANS A. NEFZGER.

REFERENCES CITED

The following references are of record in the file of this patent:

UNITED STATES PATENTS

| Number | Name | Date |
|---|---|---|
| 1,504,855 | Becker | Aug. 12, 1924 |
| 2,153,355 | Von Hofe | Apr. 4, 1939 |